United States Patent [19]

Ness et al.

[11] 4,053,249
[45] Oct. 11, 1977

[54] APPARATUS AND METHOD FOR PRECISION OVERBORING AN ARCUATE, VARIABLE DIAMETER BORE

[75] Inventors: Phillip D. Ness, Bethel Park; Robert A. Long, Pittsburgh, both of Pa.

[73] Assignee: General Electric Company, Fairfield, Conn.

[21] Appl. No.: 674,118

[22] Filed: Apr. 6, 1976

[51] Int. Cl.$^2$ .............. B23B 35/00; B23B 27/10; B23B 51/00; B23B 13/00

[52] U.S. Cl. ................ 408/1 BD; 408/83; 408/57; 408/201; 29/1.1

[58] Field of Search .............. 408/1, 56, 57, 79, 80, 408/81, 82, 83, 201, 143; 29/1.1

[56] References Cited

U.S. PATENT DOCUMENTS

| | | | |
|---|---|---|---|
| 1,002,502 | 9/1911 | Dougherty | 408/201 |
| 1,954,034 | 4/1934 | Arp | 408/83 |
| 2,014,679 | 9/1935 | Eckroate | 408/57 |
| 2,334,795 | 11/1943 | Smith | 408/83 |
| 2,956,456 | 10/1960 | Biseglia et al. | 408/82 |
| 3,028,772 | 4/1962 | Mossberg | 408/201 |
| 3,164,039 | 1/1965 | Woods | 408/56 |
| 3,854,839 | 12/1974 | Gottelt | 408/1 |

*Primary Examiner*—Harrison L. Hinson

*Attorney, Agent, or Firm*—Vale P. Myles; Joseph B. Forman

[57] ABSTRACT

An apparatus and method for precision overboring a variable diameter existing bore through a metal shaft supported in a position that causes the shaft to sag along its longitudinal axis. A plurality of precision-formed tool pilots are selectively mounted ahead of a spade bit on a rotary boring tool to maintain the path of the bit through the shaft-workpiece within a predetermined tolerance of the path followed by an existing bore. A plurality of fluted follower bearings are positioned around the tool driving shaft to minimize its vibration as the bit proceeds through the workpiece. Liquid coolant is passed at high volume into engagement with the bit and thence through the follower bearing exhaust passageways to flush metal shavings and chips from the overbore. According to the method of the invention, tool vibration is carefully monitored as the bit is forced into the workpiece. Responsive to detection of a predetermined degree of tool vibration, the pilots are selectively changed to maintain on the boring tool a pilot having a guide surface diameter within said predetermined tolerance of the various portions of the existing bore through the workpiece sequentially closest to the spade bit, as the pilot passes each such portion.

10 Claims, 4 Drawing Figures

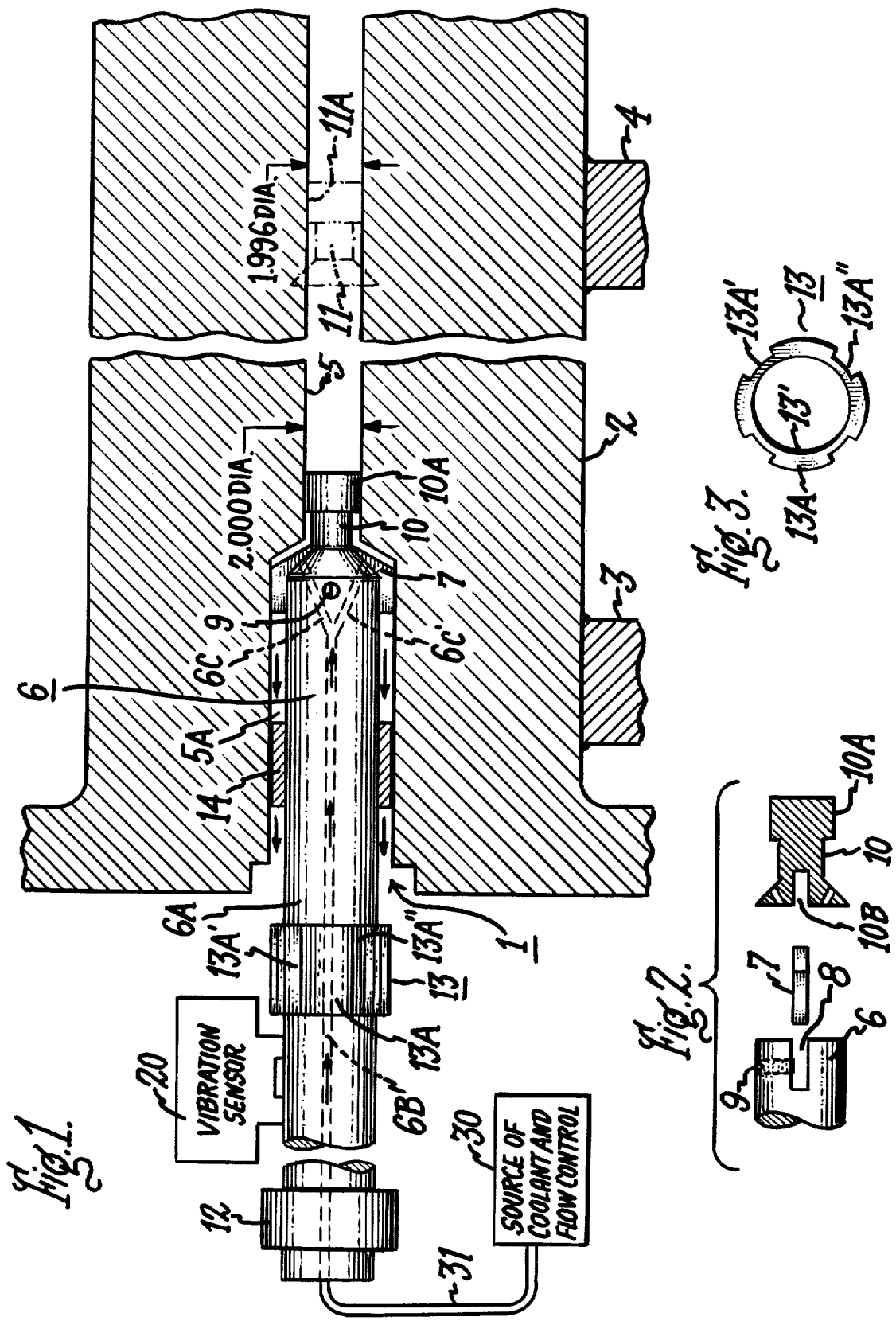

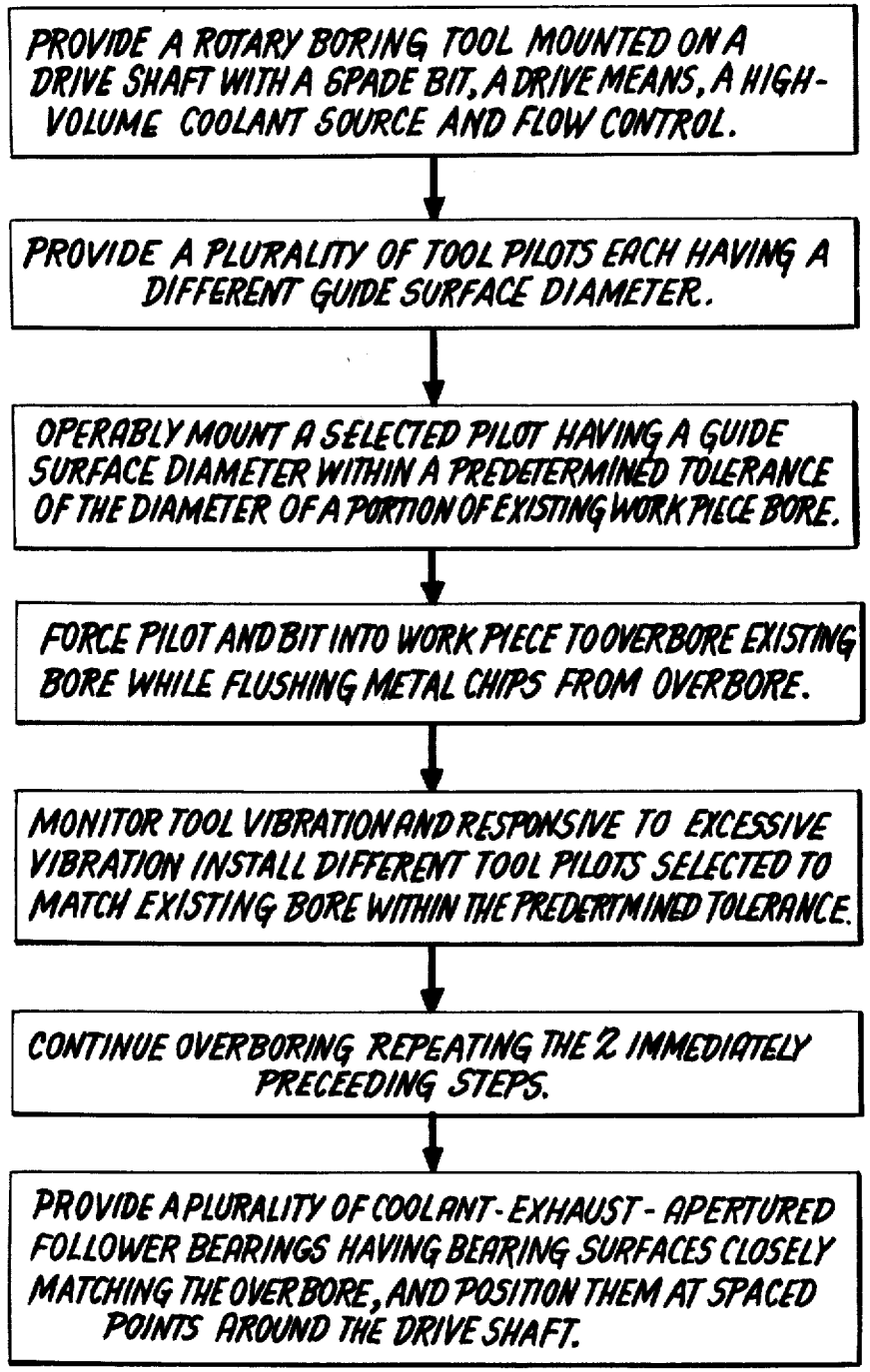

APPARATUS AND METHOD FOR PRECISION OVERBORING AN ARCUATE, VARIABLE DIAMETER BORE

BACKGROUND OF THE INVENTION

The invention relates to an apparatus and method for precision overboring an existing bore through a workpiece and, more particularly, relates to such a method and apparatus for forming a close tolerance bore through a metal shaft having an existing bore of variable diameter extending longitudinally through it in an arcuate path caused by bending or sagging of the workpiece due to its weight and supporting arrangement.

In the operation and maintenance of large rotating machinery such as turbines and dynamoelectric machines it is often necessary or desirable to overbore an existing passageway through the drive shaft or supporting shaft of such machines for a variety of reasons. Due to the enormous dynamic stresses placed on such shafts, it is necessary to maintain the dimensions of any such overbore within very close tolerances in order to avoid the introduction of an undesirable imbalance in the shaft.

Of course, various techniques of overboring existing bores through relatively small workpieces are well-known and widely used in situations either where close tolerances need not be maintained, or in circumstances such that the pre-existing bore has a uniform diameter over its length and is substantially straight. Typical examples of suitable tools for effecting such relatively simple overboring operations are shown, e.g., in the U.S. Pat. Nos. 967,789, which issued on Aug. 16, 1910, and 3,028,772, which issued on Apr. 10, 1962. As is common with the type of overboring tools shown in those two patents, they each utilize a boring tool pilot mounted ahead of the tool bit in order to guide the bit along a cutting path established by an existing bore through the workpiece.

Such prior art tools are acceptable for overboring a relatively short hole along a straight, uniform diameter existing bore in an application that requires relatively little metal to be removed by the overboring operation. However, such tools are not suitable for forming a relatively large overbore through a long, heavy machine shaft of the type described at the outset, above. Accordingly, prior to the present invention, it was necessary to remove such a large shaft from operation and transport it to a work site where heavy lathes were available to rotate the shaft relative to a conventional single blade bit, whenever it was desired to perform a close-tolerance overboring operation on it. In such overboring operations on large shafts it frequently is desirable to enlarge an existing bore by between 4 and 5 inches in diameter. Thus, it will be understood that if such an overboring operation is to be accomplished by making a single pass of an overboring tool through the shaft, an apparatus and method must be employed that will accommodate the extreme forces and temperatures developed by the removal of such a volume of metal, without causing the resultant bore diameter to waiver beyond established close tolerances that might cause the shaft to be unbalanced and ruined.

By performing such overboring operations on large shafts in a major workshop that has a lathe big enough to rotate the shaft during the overboring operation, it is possible to form a close tolerance overbore through the shaft by making repeated boring passes with a single cutting edge boring tool that is rotated in a direction counter to the direction of rotation of the shaft on the lathe. Such rotation of the shaft during that type of conventional prior art overboring operation served to effectively counteract the inevitable sag in the shaft caused by its weight and usual supporting arrangement. The major disadvantages inherent in such earlier state-of-the-art overboring methods as applied to large machine shafts, are that the shaft must be removed from operation, then transported long distances (in many cases), in order to take it to a workshop that is suitable for performing the overboring operation.

OBJECTS OF THE INVENTION

It is a primary object of the present invention to provide an overboring apparatus and method for overcoming the above-noted disadvantages of prior art overboring techniques and apparatus.

Another object of the invention is to provide a method and apparatus for pecision overboring a variable diameter existing bore through a workpiece wherein the existing bore follows an arculate path.

Yet another object of the invention is to provide an apparatus and method for overboring a metal shaft, having an existing bore in excess of 20 feet in length, by making a single overboring pass through the shaft to remove about 2 radial inches of metal around the pre-existing bore.

Still another object of the invention is to provide an apparatus and method for overboring a pre-existing bore within a predetermined close tolerance of the existing axis of a pre-existing bore, while rapidly flushing bore shavings from the overbore thereby to prevent the shavings from being welded to the sides of the overbore.

A further object of the invention is to provide a precision overboring apparatus and method wherein a plurality of apertured follower bearings are provided to afford means for rapidly flushing a high volume of metal shavings from the overbore during a boring operation.

Additional objects and advantages of the invention will be apparent to those skilled in the art from the description of it that follows considered in connection with the accompanying drawings.

SUMMARY OF THE INVENTION

In one preferred embodiment of the invention an apparatus and method for precision overboring a variable diameter existing bore through a metal shaft supported in a position that causes the shaft and existing bore to sag along their respective longitudinal axes are provided comprising, the use of a rotary boring tool having a drive shaft at least as long as the exisitng bore and including a coolant passageway through the tool drive shaft for conducting a large volume of coolant to a spade bit mounted on the boring end of the tool. A double-bladed spade bit having a fixed cutting diameter substantially larger than the diameter of the existing bore is mounted on the boring tool behind a selective one of a pluarality of boring tool pilots each of which has a different diameter guide surface that matches within a predetermined tolerance one of the respective diameters of the existing bore. In the method of the invention, as the overboring bit is forced to follow the existing bore through the metal shaft, vibration of the boring tool is monitored and responsive to detection of an excess degree of tool vibration the boring tool pilots are successively changed to maintain on the tool a pilot having a guide bearing surface diameter within said predetermined tolerance of the pre-existing bore diameter. Also, during the overboring operation, pursuant to the method of the invention, a plurality of apertured follower bearings are provided and mounted at spaced points on the tool drive shaft to force the drive shaft to rotate within a close tolerance of the longitudinal axis of the overbore. A large volume of coolant is continuously forced through the coolant supply passageway in the drive shaft as the overboring operation proceeds, thereby to cool the spade bit and flush metal shavings through the apertures in the following bearings and thence from the overbore.

DESCRIPTION OF THE DRAWINGS

FIG. 1 is a side elevation view, partly in cross-section, showing an overboring apparatus constructed pursuant to the invention and illustrated with respect to a large metal shaft that has a pre-existing bore, and is supported on bearings in a manner such that the longitudinal axis of the pre-existing bore sags relative to a straight line between the bearing support surfaces.

FIG. 2 is an exploded, side elevation view of a fragment of the boring tool shown in FIG. 1, illustrating a preferred coupling arrangement between the tool, a boring bit and a tool pilot of the type shown in FIG. 1.

FIG. 3 is an end plan view of one of the fluted follower bearings of the overboring apparatus of the invention illustrated in FIG. 1 shown in a manner such that the coolant-receiving apertures, or channels, therein are more clearly illustrated than in FIG. 1.

FIG. 4 is a chart illustrating a preferred series of steps of the method for precision overboring pursuant to the invention.

DESCRIPTION OF THE PREFERRED EMBODIMENTS

Referring first to FIG. 1 of the drawings, it will be seen that there is shown an overboring apparatus designated generally by the reference number 1, shown with respect to a large metal shaft 2 that is supported on a pair of suitable bearings 3 and 4. Typically, the metal shaft 2 will be a relatively long, i.e., around 20 to 30 feet in length, drive shaft for a steam turbine, or a large dynamoelectric machine such as a motor or generator. It is not uncommon for such large metal shafts to weigh 80 to more than 100 tons. Thus, when the shafts are mounted in a typical horizontal or inclined operating position to support a steam turbine or dynamoelectric machine rotor, there will always exist a considerable sag in the shaft along its longitudinal axis. In order to clearly describe the overboring apparatus and method of the present invention, it is only necessary to illustrate one end of the shaft 2 and a remote portion of the shaft, therefore, in FIG. 1 the shaft is simply shown as having a discontinuity between the bearings 3 and 4 and the other shaft end is not shown. To understand the invention, it should be recognized that such bearings are frequently spaced 20 feet or more apart. Consequently, there will inevitably be a sag of several thousandths of an inch in the shaft 2 relative to a true horizontal plane through it. As will become apparent from the description of the invention that follows, and as was indicated generally above, the presence of such a significant degree of sag in the shaft 2 presents a major problem when it is necessary to precisely overbore an existing bore, such as the bore 5, through the shaft.

In order to establish a precise dynamic balance of the shaft 2, and in order to eliminate stress concentrating discontinuties in it, the shaft is normally provided with a bore, such as the bore 5 prior to its initial installation. The bore 5 may extend completely through the shaft or it may be a blind bore in some cases. Another characteristic feature of such existng bores in large machine drive shafts is that they normally have a plurality of different diameters along their length. This characteristic presents a difficult problem when it is necessary to precisely overbore the existing bore and maintain the overbore accurately centered on the longitudinal axis of the existing bore. To illustrate this characteristic variation in diameters in the shaft 2 shown in FIG. 1, the bore 5 is shown as having a diameter of exactly 2 inches in the portion thereof immediately preceding the overboring apparatus 1 of the invention. At another portion of the bore 5 spaced longitudinally to the right of the 2 inch diameter portion, the bore 5 is shown as having a diameter of 1.996 inches. It will be understood that normally a long bore, such as the illustrated bore 5, will vary irregularly in diameter along its length but frequently has a generally tapered diameter, proceeding from one end to the other end of the shaft. Of course, in terms of variations of one thousandths of an inch in the diameter of the bore 5 there will be a plurality of different thousandths-of-an-inch variations along the length of the bore 5 as it tapers from the 2-inch diameter, for example, to the portion of the bore where its diameter is only 1.996 inches in diameter. The significance of such variations in the diameter of the bore 5, relative to the overboring apparatus and method of the invention, will be more fully understood from the following description.

A major advantage of the overboring apparatus 1 of the invention is that it is capable of overboring a large metal shaft within very precise tolerances, even when the shaft is supported in a position such that its longitudinal axis sags considerably. To explain this and other advantages, the details of apparatus 1 of the invention will be described first, then a preferred method for precision overboring pursuant to the invention will be described.

As shown in FIG. 1, the apparatus 1 for precision overboring the variable-diameter, existing bore 5 through the longitudinal center axis of the steel shaft 2 that is supported on the bearings 3 and 4 in a manner that causes the shaft to sag along its longitudinal axis comprises a unique combination of a number of components that incorporate both relatively conventional features, and novel features pursuant to the invention. Thus, in the preferred form of the apparatus of the invention there is provided a rotary boring tool 6 having a drive shaft 6A that is at least as long as the existing bore 5 extending through the metal shaft 2. The drive shaft 6A of the tool 6 is generally uniform in diameter so that follower bearings, which will be more fully described below, can be mounted snugly on the shaft 6A to prevent it from vibrating during movement of the bit 7 through the metal shaft 2. It will also be appreciated that the overbore diameter of bit 7 is substantially greater than the diameter of drive shaft 6A so that the follower bearings can be fitted therebetween.

Pursuant to a major aspect of the present invention, a plurality of boring tool pilots, only two of which are shown in FIG. 1 and identified by the numbers 10 and 11, are provided to practice the invention. The pilot 11 is shown in phantom, because as will be understood from the 1 following description of the invention, it will be placed in use on the boring end of tool 6 only when the overboring operation reaches the portion of the metal shaft 2 in which the existing bore 5 has a diameter that is within a predetermined tolerance range of the guide bearings surface on the pilot 11. It must be understood that in practicing the invention there will be provided a plurality of tool pilots each of which have a respective different-diameter, precision formed, cylindrical guide surface, such as the guide surfaces 10A and 11A on the illustrated pilots. Each of these guide surfaces is made to match with a predetermined negative tolerance one of the respective diameters of the existing bore 5 through the metal shaft 2. It has been found that in order to successfully overbore a large turbine shaft without excessively unbalancing it, it is necessary that the predetermined negative tolerance within which each pilot guide surface 10A, 11A, etc., must match the diameter of the existing bore 5 at the portion thereof being cut by the spade bit 7, be no greater than one thousandth of an inch while such overboring is taking place. Accordingly, pursuant to the invention, in its preferred embodiment, the plurality of tool pilots 10, 11, etc., are sequentially mounted in operating position on the boring end of the rotary tool 6 ahead of the bit 7, as it is moved through the shaft 2, thereby to selectively use each pilot having a guide surface that matches within the desired predetermined tolerance in a given application, the respective different diameters of the existing bore 5, in order to accurately guide the bit 7 successively past the respective variable diameter portions of the existing bore. Frequently, the plurality of such tool pilots needed to overbore a given shaft will be ten or more in number.

As the bit 7 is driven through the metal shaft 2 by operation of the drive shaft 6A, which it will be understood is coupled in operating relationship to a suitable drive means such as a rotatable chuck 12, a plurality of follower bearings, two of which are designated by the numbers 13 and 14 in FIG. 1, are mounted on the shaft 6A. Ordinarily, the plurality of follower bearings required to suitably overbore a 20 foot shaft, pursuant to the invention will be four or five in number, so that one such bearing can be mounted every 4 feet or so along drive shaft 6A. Each of the follower bearings 13, 14, etc., has a precision formed, generally cylindrical outer surface 13A, 14A, etc., the outer diameter of which is formed to match within a given negative tolerance the maximum fixed cutting diameter of the bit 7. In the preferred embodiment of the invention described herein, the outer diameter of each follower bearing 13, 14, etc., is made to match the maximum cutting diameter of the bit 7 within the range of 0.001 to 0.002 inch. By maintaining these close tolerances on the follower bearing relative to the overbore 5A formed by bit 7, the vibration of drive shaft 6A can be maintained within acceptable limits to keep the diameter of the overbore adequately close to the predetermined tolerances established for it relative to the axis of rotation of shaft 2.

Additional important features of each follower bearing 13, 14, etc., are illustrated in FIG. 3 of the drawings which depicts the follower bearing 13 in a back end view. A description of the bearing 13 will serve to describe the novel features of all of the other follower bearings, because they are substantially identical in the preferred embodiment of the invention. Thus, the bearing 13 (and all of the other follower bearings) includes a first wall means 13' that defines a central aperture through it to enable the bearing to be slid snugly over the boring tool drive shaft 6A for rotation therewith. The bearing 13 also includes a second wall means 13A', 13A", etc., that defines a plurality of exhaust apertures which extend longitudinally through the bearing for conducting coolant and metal shavings rapidly away from the bit 7 and out of the overbore 5A in the practice of the invention. In the illustrated preferred embodiment of the invention, the exhaust apertures 13A', 13A", etc., extending through the respective bearings 13, 14, etc., each comprises a channel (as seen in FIGS. 1 and 3) formed in the outer surface of the bearing 13. In the more preferred embodiment of the invention each channel 13A', 13A", etc., has an arcuate width in the range of 20° to 30° and has a radial depth of at least ⅛ inch.

This preferred configuration and arrangement of the respective exhaust channels allows them to rapidly pass a high volume of coolant therethrough, which is important to the proper practice of the invention. Because it is most desirable to form the overbore 5A by making a single cutting pass of the bit 7 through the length of the metal shaft 2, and because the overbore 5A typically exceeds the diameter of the existing bore 5 by about 4 or 5 inches, and is thus substantially larger than the existing bore, it will be appreciated that a large volume of hot metal shavings will be quickly deposited in the overbore by operation of the bit 7 and could result in welding of the shavings to the overbore if the chips were not quickly flushed away. The configuration and arrangement of the exhaust channels in the follower bearings 13, 14, etc., as described above, affords this desired function when a high volume of coolant is forced through the multiple outlet passageways 6C and 6C' of the boring tool 6, pursuant to the preferred practice of the invention. It has been found that a flow of coolant at a rate in excess of 5,000 gallons per hour is most suitable for insuring against the welding of metal bit shavings to the overbore 5A.

Before leaving the description of the follower bearing 13 shown in FIG. 3, it should be understood that each follower bearing is made to have an inner diameter which matches the generally uniform diameter of the tool drive shaft surface 6A within a positive tolerance of 0.0005 to 0.001 inch in the preferred embodiment of the invention. This close tolerance between these two components of the apparatus 1 of the invention assures that the follower bearings can be forced onto the drive shaft 6A so that they will rotate with it as the shaft 6A is forced through the workpiece shaft 2. Similarly, it will be noted that in this preferred embodiment of the invention, each of the follower bearings 13, etc., is provided with four equally spaced channels 13A', 13A", etc., so that one or two of the channels is always disposed at, or closely adjacent, the bottom of the overbore in positions where they can readily receive the high volume flow of coolant and entrained metal shavings.

Finally, it will be understood that the follower bearings 13, 14, etc., will be positioned respectively around the tool drive shaft 6A at predetermined longitudinally spaced points thereon such that the vibration of the drive shaft is minimized. It has been found that in overboring long steel shafts such as the shaft 2, a suitable spacing for the follower bearings is approximately 4 feet.

In operating the apparatus 1 of the invention pursuant to the preferred method of the invention, it is necessary to provide a suitable sensing means for detecting a predetermined excessive degree of vibration of the tool 6.

A wide range of such vibration sensing means is commercially available, thus, only a schematic illustration of a suitable vibration sensor 20 is illustrated in FIG. 1 in order to facilitate the description of the invention. In fact, it has been found that in practicing the precision overboring method of the invention with the apparatus 1, a skilled operator can be trained to accurately sense an excessive degree of tool vibration by touching the drive shaft 6A with his hand and listening for variations in the chatter sound caused by different degrees of looseness between a tool pilot (10, 11, etc.) in place on the boring end of the tool 6. Thus, it will be understood that in some applications of the invention the vibration sensor 20 may simply be the hand of a skilled overboring tool operator suitably trained in the application of the present invention.

Before leaving the description of the preferred apparatus 1 of the invention, brief reference will be made to FIG. 2 in order to describe a suitable means for attaching the tool pilot 10 (and the other pilots 11), etc.) to the boring end of the rotary tool 6, shown therein. In this form of the invention, the tool pilot 10 is provided with a slot 10B that slides over the spade bit 7 when assembled in operating position in the manner shown in FIG. 1. Normally, a suitable holding screw (not shown) is used in the manner described below with reference to screw 9, to secure the respective pilots 10, 11, etc., in operating position on the tool 6, as is well-known in the art. Finally, it will be noted that the pilots 10 include apertures in the conical base portion thereof which comprise extensions of the multiple coolant carrying passageways 6C and 6C' of the rotary tool 6, so that coolant can be forced therethrough into engagement with the cutting surfaces of the bit 7 during operation of the boring tool, as is also conventional in the overboring art. Spade bit 7 is held on tool 6 within a similar slot 8, and is locked therein with a holding screw 9, as seen in FIGS. 1 and 2.

The operation of the apparatus 1 of the invention will be described in connection with the description of the preferred method of the invention which follows. To facilitate that description, reference is made to FIG. 4 of the drawing which shown a step-by-step flow chart of a preferred sequence of operating steps of the method of the invention. Pursuant to the method of the invention, a rotary boring tool having a coolant passageway through the drive shaft thereof and having a suitable tool driving means coupled in operating relationship thereto is provided, along with a suitable source of liquid coolant and any of a number of conventional coolant flow control means associated with the tool drive means in a manner capable of forcing coolant through the tool at a rate of at least 5,000 gallons per hour.

A spade bit, such as the bit 7 described with reference to FIG. 1, is mounted on the boring tool 6, and a plurality of boring tool pilots, each having a different guide surface diameter, is provided. A selected one of the pilots 10 is initially mounted on the tool 6 so that the pilot selected has a guide surface diameter within a predetermined tolerance of the diameter (shown in FIG. 1 as 2 inches) of the bore 5 in the workpiece (shaft 2 in FIG. 1) adjacent the end thereof at which the overboring operation is to be commenced.

The tool drive means is then operated to force the tool pilot into the existing bore 5 and to drive the spade bit into the workpiece 2, thereby to overbore the existing bore 5 in the workpiece. During this overboring operation, the fluid flow control means is operated to force a high volume of liquid coolant through the passageways 6C and 6C' and out of the overbore 5A. In the preferred practice of the invention, as described above, the flow control means are operated to cause coolant to flow through the drive shaft 6A and out the exhaust passages 13A', 13A'', etc. in the follower bearing 13, 14, etc., at a rate of at least 5,000 gallons per hour while the bit is being driven in cutting relationship through the workpiece 2.

While the drive means is operated to move the bit 7 through the workpiece 2, and the flow control means is operated to force coolant through the multiple outlets 6C and 6C', vibration of the rotary tool 6 is monitored to detect a degree of vibration indicative of a predetermined tolerance being either preserved or exceeded between the guide bearing surface 10A, 11A, etc. and the adjacent diameter of the existing bore 5 being exceeded. Responsive to an indication by the monitor or sensing means that an excessive vibration exists, the bit 7 is withdrawn from the workpiece 2 and the pilot 10 thereon is changed to place another pilot, such as the pilot 11, on the tool 6. The guiding surface diameter of the new pilot is selected to be within the aforesaid predetermined tolerance of the portion of the existing bore 5 then closest to the bit. As pointed out above, in the preferred method of the invention, said predetermined tolerance is 0.001 inch, in order to maintain the diameter of overbore 5A within a suitably close tolerance of the centerline of existing bore 5 to assure maintenance of a proper balance in the type of precision machined shaft 2 described above.

The overboring operation pursuant to the method of the invention is continued until completed, by repeating the foregoing steps of driving the bit 7 forward through the workpiece 2, while monitoring vibration of tool 6 and changing the pilots as needed to maintain a tolerance between the respective guide surfaces of the pilots and the sucessively encountered portions of the existing bore 5 within the predetermined tolerance.

As the rotary tool 6 moves into the workpiece 2, a plurality of follower bearings 13, 14, etc. is provided, each having a plurality of coolant exhaust passages extending longitudinally therethrough, and each having a maximum generally cylindrical outer diameter that matches the maximum cutting diameter of the bit 7 within the aforesaid predetermined tolerance, (0.001 to 0.002 inch). These follower bearings are mounted respectively at spaced points on the tool drive shaft 6A prior to the movement of the spaced points into the overbore 5A, when the foregoing steps of the method of the invention are continued. As explained above, for large turbine shafts, such as the shaft 2 described at the outset, it has been found that the follower bearing 13, 14, etc., are preferably spaced at points about 4 feet apart on the drive shaft 6A pursuant to the method of the invention. Further, in the manner described above with reference to the structure of overboring apparatus 1 of the invention, in practicing the method of the invention it is preferable that each follower bearing be provided with four equally spaced exhaust passages 13A', 13A'', etc., each in the form of a channel having a minimum radial depth of ¼ inch and an arcuate width of at least 20°. In the most preferred method of the invention useful in overboring large turbine shafts, the exhaust channels 13A', 13A'', etc., are ⅜ inch deep and have an arcuate width of 25°.

Those familiar with the art of overboring large metal shafts will understand that various alterations and improvements may be made in the apparatus and method of the invention described above; accordingly, it is our intention to encompass within the following claims the true spirit and scope of the invention.

What we claim as new and desire to secure by Letters Patent of the United States is:

1. Apparatus for precision overboring a variable diameter existing bore along the longitudinal center axis of a metal shaft supported in a position that causes the shaft to sag along the longitudinal axis of said existing bore, comprising, a rotary boring tool including a boring end and having a drive shaft at least as long as said existing bore, said drive shaft including wall means defining a multiple-outlet passageway for conducting coolant to the boring end of the tool, a double-bladed spade bit operably mounted on the boring end of the tool, said bit having a fixed cutting diameter substantially larger than the maximum diameter of said drive shaft, one of a plurality of boring tool pilots operably mounted as the leading end of the boring tool immediately ahead of said bit, each said pilot having a precision-formed cylindrical guide surface that matches within a predetermined negative tolerance to one of the respective diameters of the existing bore through the metal shaft upon which the apparatus is to operate, each of said pilots being selectively mountable in operating position on the boring end of the rotary tool ahead of the bit, with the particular pilot having a guide surface matching within said predetermined negative tolerance the respective diameter of the existing bore of the metal shaft upon which the apparatus is to operate immediately ahead of said bit, and a plurality of follower bearings having precision formed generally cylindrical outer surfaces the outer diameter of which follower bearing matches within a given negative tolerance the maximum fixed cutting diameter of said bit, each follower bearing including a first wall means defining an aperture through the center thereof that enables the bearing to slide snugly over the boring tool drive shaft for rotation therewith and including a second wall means defining a plurality of exhaust apertures extending longitudinally through the bearing for conducting coolant and metal shavings rapidly away from the bit and out of the overbore, said follower bearings being positioned respectively around the tool drive shaft at longitudinally spaced points thereon.

2. An invention as defined in claim 1 wherein each exhaust aperture extending through the respective follower bearings comprises a channel formed in the outer surface of the bearing, each said channel having an arcuate width in the range of 20° to 30° and having a radial depth of at least ¼ inch.

3. An invention as defined in claim 2 wherein said tool drive shaft has a generally uniform diameter, cylindrical outer surface, and each of said follower bearings comprises an annulus the inner surface diameter of which matches the generally uniform diameter of the tool drive shaft surface within a negative tolerance of 0.0005 to 0.001 inch.

4. An invention as defined in claim 3 wherein each follower bearing is provided with four equally spaced exhaust channels, and wherein said given negative tolerance within which the outer diameter of each follower bearing matches the maximum cutting diameter of said bit is in the range of 0.001 to 0.002 inch.

5. An invention as defined in claim 2 wherein the fixed cutting diameter of said bit is at least 2 inches greater than the diameter of said existing bore, and wherein said predetermined negative tolerance within which the pilot guide surface matches the diameter of the existing bore is no greater than 0.001 inch.

6. A method for precision overboring a variable diameter existing bore along the longitudinal center axis of a metal shaft supported in a position wherein the shaft sags along the longitudinal axis of said existing bore, comprising the steps of:

a. providing a rotary boring tool having a drive shaft at least as long as said existing bore and having a coolant passageway extending through the length thereof, and providing drive means operatively connected to said tool for driving it through said existing bore, b. providing a source of liquid coolant and flow control means for selectively forcing coolant through said passageway, c. mounting a double-bladed spade bit in operative position on the boring end of said tool, said bit having a fixed cutting diameter substantially larger than said existing bore diameter, d. providing a plurality of boring tool pilots each having a different diameter, precision-formed, cylindrical guide surfce that matches within a predetermined tolerance one of the respective diameters of said existing bore, and mounting on said tool ahead of the bit one of said pilots matched to within said predetermined tolerance of the diameter of said existing bore at one end thereof, e. operating said drive means to drive the pilot through said one end of the existing bore and to cause the bit to cut an overbore the longitudinal axis of which is caused by said pilot to match the longitudinal axis of the existing bore within said predetermined tolerance, f. operating said flow control means to cool said bit and to rapidly flush metal chips out of the overbore, g. monitoring the vibration of said rotary tool as the bit is driven through the shaft, thereby to detect a degree of vibration indicative of said predetermined tolerance being exceeded, and responsive to an indication of such excessive vibration changing the pilot initially mounted on said tool for another pilot having a guiding surface diameter within said predetermined tolerance of the portion of said existing bore then closest to the bit, h. continuing the overboring by repeating steps (e) and (f) and then repeating step (g) to successively substitute different diameter pilots as indicated by the detection of excessive tool vibration until the overbore is completed, i. providing a plurality of generally cylindrical follower bearings each having a plurality of coolant exhaust passages extending longitudinally therethrough, and each having a maximum outer diameter that matches the maximum cutting diameter of said bit within said pedetermind tolerance, and j. mounting said follower bearings at spaced points on said drive shaft prior to the movement of said spaced points into the overbore as the operations of step (h) are continued.

7. The method as defined in claim 6 wherein said coolant flow control means are operated to cause coolant to flow through the drive shaft and said exhaust passages at a rate of at least 5,000 gallons per hour while the bit is being driven in cutting relationship through said metal shaft.

8. The method as defined in claim 7 wherein said coolant passageway through the tool is provided with mutiple outlets arranged to direct coolant around said bit and thence through the exhaust passages in said follower bearings.

9. The method as defined in claim 8 wherein said predetermined tolerance is not greater than 0.001 inch.

10. The method defined in claim 9 wherein each follower bearing is provided with four equally spaced exhaust passages, each in the form of a channel having a radial depth of at least ⅛ inch and an arcuate width of at least 20°.

* * * * *